W. R. McGOWEN.
HAY LOADER.
APPLICATION FILED OCT. 19, 1904.
920,077.
Patented Apr. 27, 1909.
3 SHEETS—SHEET 3.
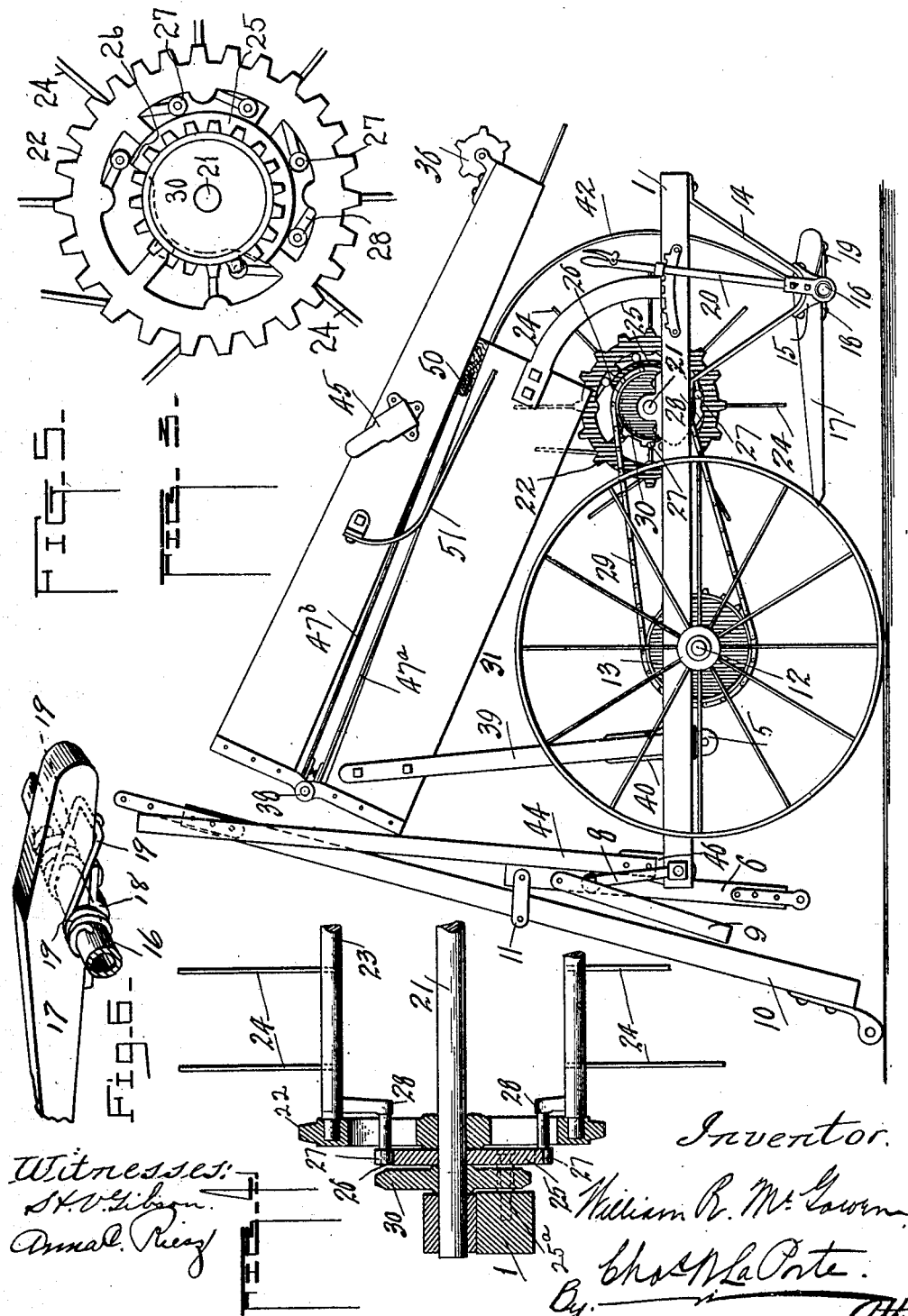

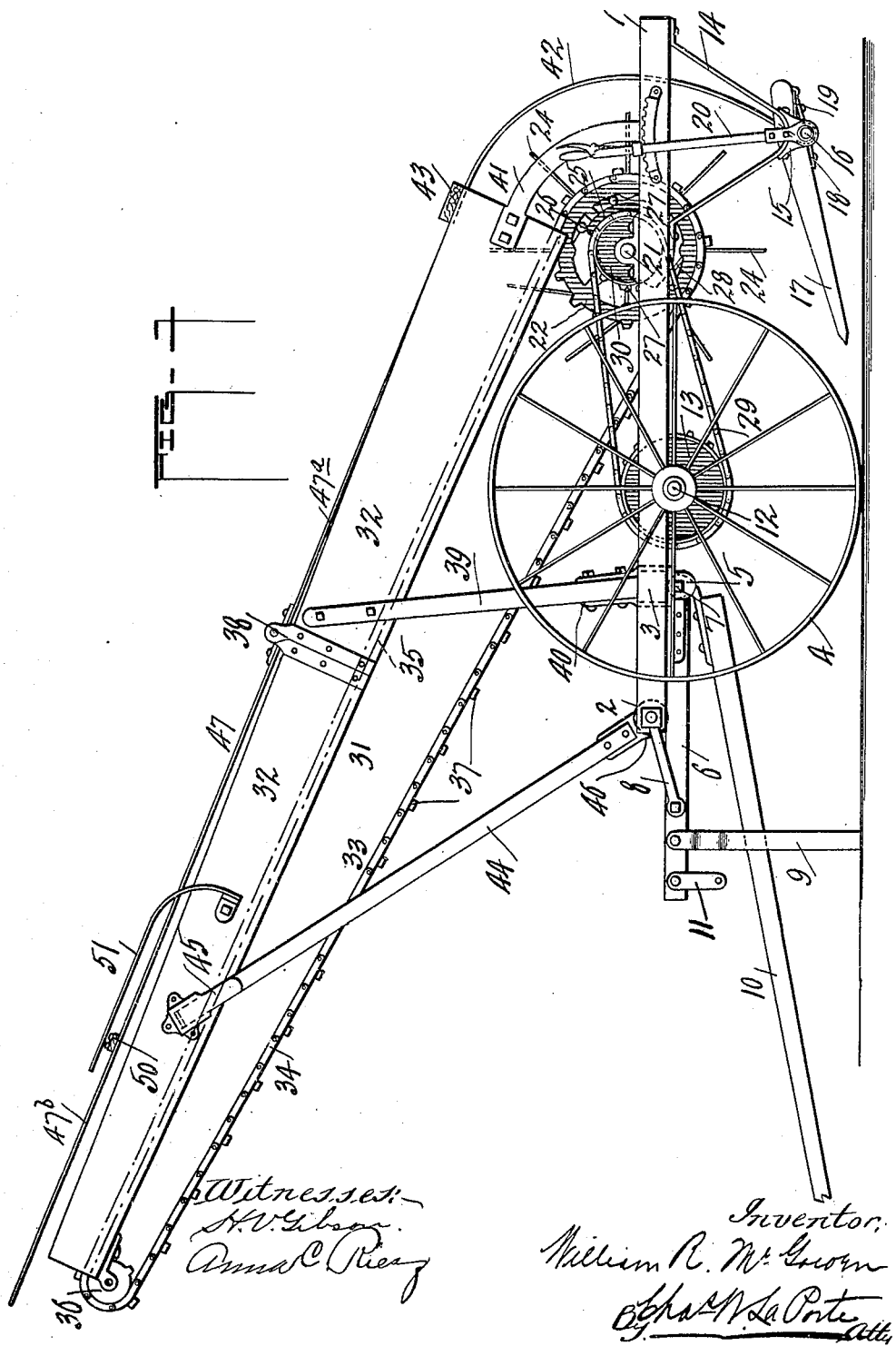

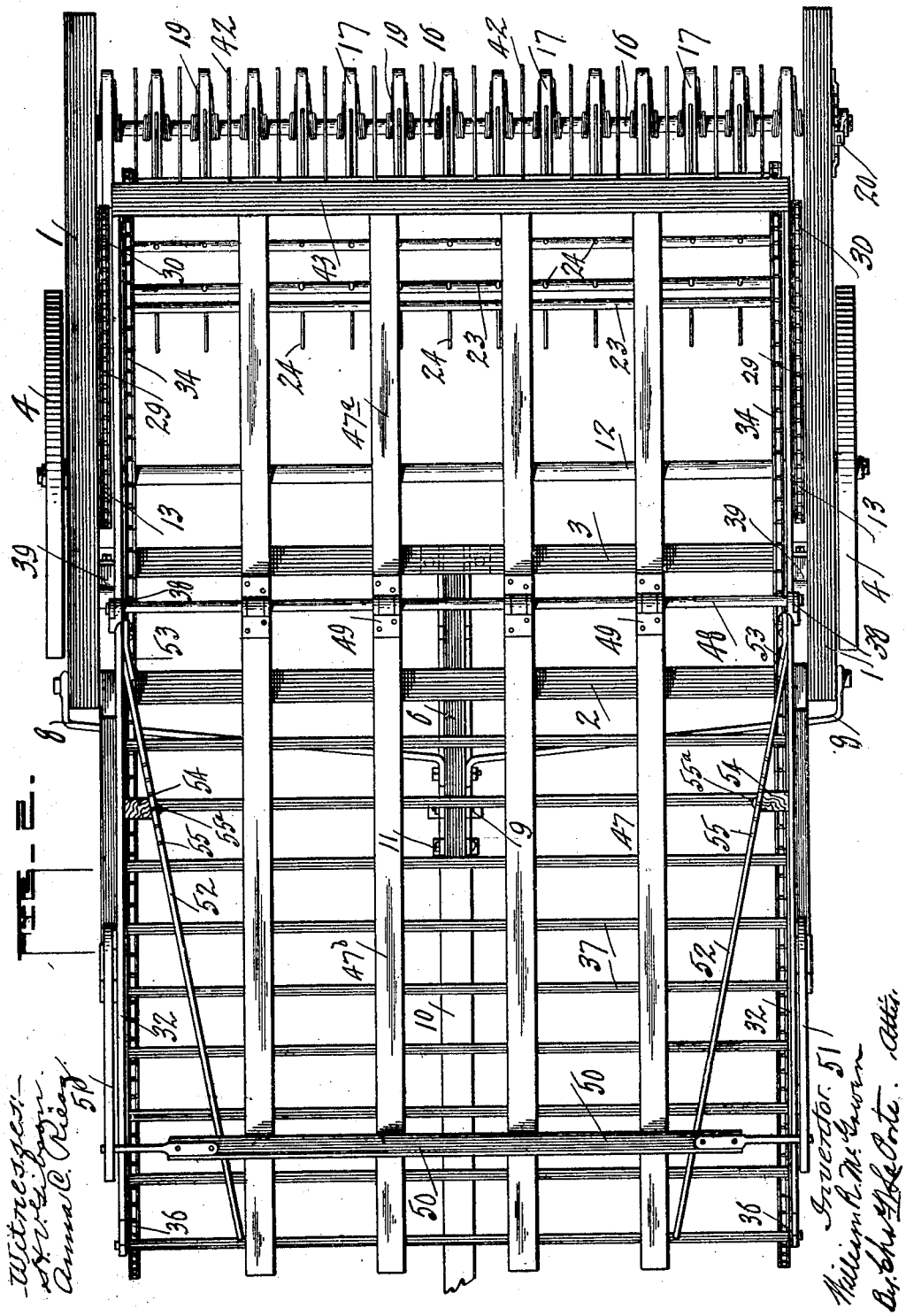

UNITED STATES PATENT OFFICE.

WILLIAM R. McGOWEN, OF KNOXVILLE, ILLINOIS, ASSIGNOR OF ONE-HALF TO JAMES S. FIELD, OF PEORIA, ILLINOIS.

HAY-LOADER.

No. 920,077.  Specification of Letters Patent.  Patented April 27, 1909.

Application filed October 19, 1904. Serial No. 229,105.

*To all whom it may concern:*

Be it known that I, WILLIAM R. McGOWEN, a citizen of the United States, residing at Knoxville, in the county of Knox and State of Illinois, have invented certain new and useful Improvements in Hay-Loaders; and I do hereby declare that the following is a full, clear, and exact description of the invention, which will enable others skilled in the art to which it appertains to make and use the same.

This invention has reference to certain new and useful improvements in hay loaders and has particular reference to what will be termed a folding sweep hay loader. Its object is to gather hay from the swath or windrow without making any change or adjustment, and adapted to gather the hay free from any under trash without agitation of the hay or the gatherer, and deliver the same on to a wagon without threshing or roping the hay.

A further object of the invention is a hay loader provided with an elevator or carrier, an elevating cylinder driven by the carrier and adapted to receive and deliver the hay to the carrier, a sweep rake adapted to gather the hay and deliver the same to the cylinder, and the frame of the machine constructed to fold upon itself.

The invention has for its further object certain details of construction to be hereinafter more particularly pointed out in the following specification, claimed in the appended claims and illustrated in the accompanying drawings, in which:—

Figure 1 is a side elevation of one side of the machine, showing the elevating frame extended its full length, and the machine in working position; Fig. 2 is a plan view of the machine seen in Fig. 1, omitting several of the slats of the carrier to give a better view of parts beneath; Fig. 3 is a side elevation of the loader, showing the elevator folded upon itself, the gathering teeth raised, and the tongue and component parts detached and stationed against the machine; Fig. 4 is an enlarged sectional detail of one end of the gathering cylinder, showing the means of driving the cylinder and the mode of changing the position of the teeth thereof when elevating hay to the carrier and moving away after the hay is delivered. Fig. 5 is a view in end elevation of the elevating cylinder, clearly illustrating the elements as shown in Fig. 4, the various elements shown in Fig. 4 being drawn upon a scale coinciding with that of Fig. 4. Fig. 6 is a view in perspective of one of the gathering teeth, clearly illustrating the connection of the teeth with the rod or bar 16.

Like numerals of reference indicate corresponding parts throughout the figures.

The supporting frame of the loader, consists of the side sills 1, suitably connected by the cross braces 2 and 3 which serve a further purpose, to be described. The frame is mounted on the ground wheels 4. To the brace 3 of the frame is secured a bracket or bearing 5 to which is pivotally and detachably connected a reach 6 by means of the pin or stud 7. The forward end of the reach 6 is braced by means of the bars 8 secured at their forward ends to the reach 6 and diverging to and secured to the forward ends of the sills 1. To the reach 6 is attached the usual foot standards 9, that provide for supporting the forward portion of the machine on the ground when not connected with a wagon. To provide for connecting with a hay wagon, a pole or tongue 10 is provided, the inner end of which is pivotally and detachably secured to the bracket 5, by means of the same pin or stud 7 which connects the reach 6 to the said bracket. The purpose of which, is that when the loader is folded, as will be described, the releasing of the pin 7 permits the reach 6 and the tongue 10 to be released from the bracket 5, and the parts placed somewhat in the position seen in Fig. 3, for storing in a barn or similar inclosure. The tongue is guided in its extended position when the same is connected to a hay wagon, by the guide plates 11, which overlap the sides of the tongue and are secured to the reach 6, as shown. The ground wheel 4 is carried by an axle 12, suitably carried in bearings, not shown, secured to the lower face of the sills. To the opposite ends of the axle 12 and within the sills, is seen a pair of driving sprocket wheels 13, adapted to have connection, as will be described, with elevating means for the hay.

To the lower side of the rear ends of the sills 1, is secured suitable brackets 14, which are suspended beneath the sills, and their lower portions positioned in close proximity to the ground. To the lower ends of the brackets are secured the bearing plates 15, and in these plates, the opposite ends of a tubular bar or rod 16 are secured. At suitable intervals on the tube is pivotally secured a series of gathering teeth 17, which taper to a point, and extending forwardly in their normal position, are carried in a sloping or inclined position, so that the forward ends of the teeth all but contact with the ground. The teeth are supported on the rod to oscillate with or independently thereof, by means of half boxings 18, the teeth crossing the rod 16 and where connected thereto, the teeth also have a spring connection, through springs 19, attached to the rear body portion of the teeth, with portions of the spring coiled about the rod and secured thereto. The springs permit the teeth to give to the irregularities of the ground and return again to their normal positions. To depress the teeth or to raise the same when the machine is being transported or stored, or for any other reason, I have provided a lever connection 20, with the rod 16 for the purpose of changing the position of the teeth, as suggested. The lever being regulated and retained in adjusted positions by means of the customary detent and rack, as will be understood and common to levers of this type.

Above the teeth is located an elevating cylinder, which comprises a shaft 21, its opposite ends journaled in boxings secured to the sills 1. On the shaft 21, and at or near its opposite ends is secured the sprocket wheels 22, to which are revolubly secured a series of rods or bars 23, which extend from one sprocket to the other, to these rods 23, at intervals, is secured a series of prongs 24, adapted for lifting the hay gathered by the teeth 17, and elevating the same to a carrier to be described.

Adjacent to the sprockets 22 and on the shaft 21, are carried the non-revoluble disks 25 having irregular or cam peripheries 26, and on these peripheries ride the rollers 27 attached to arms 28 which are secured at their opposite ends to the rods or bars 23. The disks 25 are, by suitable means such as studs 25ª (see Fig. 4), secured to the sills 1, while the arms 28 have right angle extensions which pass between the spokes of the sprocket wheels 22 to adapt the rollers 27 to ride thereon. The cam disks are so positioned with reference to the elevating of the cylinder, that the prongs 24 assume a position extending at right angles to the axis of the shaft 21, when elevating hay from the gathering teeth to the carrier, to be described, and after the delivery of the hay to the carrier, the prongs 24, through the action of the rollers 27 on the cam disks, will adapt themselves to whatever position is necessary to free themselves from the hay as the same is deposited on the carrier. As the rollers 27 follow the irregular periphery of the cam disk, it will be readily understood that the position of the rods 23 will be changed, and thereby change the position of the prongs 24 from a position extending at right angles to the axis of the shaft 21 to a position bearing obliquely to the axis of the said shaft, as seen in the figures. The cylinder shaft 21 is driven from the axle 12 through the sprocket wheels 13, by means of a sprocket chain connection 29 with the sprocket wheel 13 to sprocket pinions 30 on the cylinder shaft 21, as is cleerly seen in the figures.

Supported by the ground wheels and particularly the main frame which consists of the sills 1 and braces 2 and 3, is the inclined, forwardly extending carrier frame 31, and the said carrier frame essentially comprises opposite side frame parts 32, that serve to confine the hay onto the endless carrier apron 33, that travels within the carrier frame. The endless carrier apron 33 comprises the usual side endless carrier chains 34, that are of the ordinary drive chain construction, and the same are adapted to travel around the sprocket wheels 22 of the elevating cylinder, through the carrier frame upon the longitudinal cleats 35 secured to the side frames 32 over the idler chain wheels 36, at the upper forward end of the carrier frame, and down to and around the wheels 22 as described. To the chains 34, at intervals, are secured the usual elevating or carrier slats 37.

The side frames 32 of the elevator or carrier are made in two sections, and jointed or hinged on a rod at 38 whereby the same may be folded, one upon the other, somewhat as seen in Fig. 3. To fold the sections of the elevator upon itself, it is first necessary to uncouple the carrier chains, all of which it is believed is understood. The inner sections of the carrier frame are permanently supported by means of the standards 39, secured at their upper ends to the frame 32 and their lower ends secured in brackets 40 secured to the brace 3; also the inner plates or braces 41 secured to the extreme ends of the frame 32 and their opposite ends to the sills 1. The rear of the loader is provided with rod guards or guides 42, the lower ends of the said rods being connected to the tubular rod 16, and the upper portion of the rods bowed to conform to the outer sweep of the prongs 24, with the upper ends of the rods connected to a cross piece 43 of the elevator. The outer sections of the carrier frame are suitably supported in their extended or unfolded position for elevating, by means of the bars or frames 44, which have a detachable connection with the socket brackets 45 attached to the frames 32 of the elevator frame and their lower ends pivotally connected at 46 to the brace 2. When the outer section of the elevator is folded, the bars 44 are disconnected from the brackets 45 and placed in the position, somewhat as seen in Fig. 3.

Arranged over the endless carrier are a series of parallel longitudinally disposed compression slats 47, having the fixed inner sections 47$^a$ and the outer folding sections 47$^b$, these slats serving to hold the hay on the carrier while being elevated onto the wagon; the inner ends of the slat sections 47$^a$ are secured to the brace 43, while the matching ends of the sections 47$^a$ and 47$^b$, are hinged to a common rod 49 through the hinges 49, the said rod being connected to the hinges 38 of the elevator sections. To retain the outer free ends of the slat sections 47$^b$, yieldingly over the hay and the mouth of the elevator, I provide the cross frame or slat 50, which is movably placed across and upon the slat sections 47$^b$, and the outer opposite ends engaged by the spring arms 51 which are secured to the outer sections 32 of the elevator.

There is combined with the compression slats, a means for narrowing the path of the hay as the same is conveyed to the discharge end of the elevator. This means consists of the frames or boards 52, which are carried between the forward sections 32 of the elevator frame and secured to the same at points 53, so as to permit the forward ends of the boards 52 to be swung inwardly toward each other or outwardly toward the side frames of the elevator. The disposition of the boards, is above the carrier and its slats, so as not to interfere with the same. To fix the position of the boards 52 after adjustment, I have provided the blocks 54, and perforated the boards at 55, so that by the forward or inward shifting of the said blocks, and the securing of the boards thereto, which may be accomplished by placing a bolt or pin 55$^a$ through the perforations in the boards and a corresponding perforation in the blocks.

It will be seen therefore, that as the machine is being operated, the gathering teeth will slide under and raise the hay from the ground, when the elevating cylinder will elevate the hay on to the carrier where the hay will be carried up the elevator and deliver the same onto the wagon preceeding the loader.

The principle involved in gathering hay is the same as in the sweep rake, shown and described in an application filed of even date herewith. By the use of such a device, the ground is raked perfectly clean, scattering little or no hay. The teeth do not pick up the under trash from the meadow bottom, as they do not gouge into the ground, the hay being gathered perfectly free from dirt. The hay is further gathered and raised gradually and gently, no threshing or rolling, as there is no action of the teeth necessary for the raking.

In my machine, as above suggested, the cylinder has nothing to do with the raking or gathering of the hay, it being located very high from the ground and is for the purpose of elevating the hay from the gathering teeth onto the carrier; the cylinder is speeded to take up hay faster than the loader travels and can accumulate on the gathering teeth. The carrier, which is adapted to travel at the same rate of speed as the cylinder, carries off the hay as fast as the cylinder delivers it.

By the use of a continuously moving slat or apron belt, the hay can be handled without snatching or grabbing, as in some loaders and this obviates breaking the hay. Clover hay especially, is very seriously injured if delivered in a snatch and grab way common to "tedder crank loaders". Attention is further directed to the fact that my entire machine is carried and supported by the carrying wheel 4, no part being allowed to drag on the ground, making it the lightest draft, with more traction power than any other loader.

In my machine, the points of the teeth are located so close to the center of the ground wheels, any up or down motion of the tongue causes only a slight variation up or down, of the points of the teeth.

The advantages of my machine are, that it takes the hay eight feet wide at the bottom and gradually compressing and narrowing the same, delivers it four feet wide at the top, in a loose mass and with every leaf and every head it had when gathered from the ground. The machine being quickly and conveniently folded for storing, by removing one bolt and uncoupling the carrier chain, when the machine stands as in Fig. 3.

Having thus fully described my invention, what I claim and desire to secure by Letters Patent of the United States, is:—

1. In a hay loader, the combination of a frame and ground wheels supporting the same, an elevator supported by the frame composed of a fixed and a folding section, an elevating cylinder revolubly mounted beneath the rear end of the fixed section and to the rear of the axle supporting the ground wheels, a series of sweep-rake gathering teeth supported beneath the cylinder, a support for the teeth suspended from the frame on which the teeth may have an oscillatory movement, and means for oscillating said support.

2. In a hay loader, the combination with a frame and ground wheels supporting the same, an elevator supported by the frame composed of a fixed and a folding section, an elevating cylinder revolubly mounted beneath the rear end of the fixed section and to the rear of the axle supporting the ground wheels, a series of sweep-rake gathering teeth supported by the frame beneath the cylinder, a rod supporting the teeth, each of which may have an independent oscillatory movement on said rod, means for oscillating the rod, and thereby the teeth in unison, and a series of guards extending down from the rear fixed end of the elevator.

3. In a hay loader, the combination with an elevator, a rod supported beneath the receiving end of the elevator, a series of teeth attached to the rod so as to oscillate freely thereon, means for rocking the rod and with it said teeth, and a cylinder revolubly mounted above the teeth adapted to receive and elevate material from the teeth to the elevator.

4. In a hay loader, the combination of an elevator composed of a fixed section and a folding section hinged thereto, compression slats consisting of hinged sections hinged to a rod connected to the hinges of the elevator, a series of hay gathering teeth supported beneath the receiving end of the elevator, and means for delivering hay from the teeth to the elevator, substantially as specified.

5. In a hay loader, the combination with an elevator, a rod suspended transversely beneath the receiving end of the elevator, a series of teeth attached to and projecting forwardly from said rod, means for yieldingly holding the teeth in an inclined position and their forward ends just above the ground, a lever for changing the position of the rod and teeth at will, and an elevating cylinder revolubly supported above the teeth and beneath the elevator.

6. In a hay loader, the combination of an elevator composed of a fixed section and a folding section, a series of folding compression slats, a series of sweep-rake gathering teeth, a support for said teeth, means for yieldingly holding each tooth to adapt it to have independent movement, means for oscillating the support to change the angle of the teeth, and means for elevating material from the teeth to the lower fixed end of the elevator.

7. In a hay loader, the combination with an elevator having a lower fixed end, an elevating cylinder revolubly supported in juxtaposition to its lower fixed end, a carrier actuated by said cylinder, a series of sweep-rake gathering teeth beneath the cylinder, a transverse rod suspended below the level of the cylinder for carrying said teeth, means for yieldingly attaching each tooth to adapt it to have movement independent of the rod, and means for oscillating the said rod to change the angle of all the teeth in unison.

8. In a hay loader, the combination of a frame supported on carrying wheels, an elevator composed of a section rigidly supported by and above the frame, and a folding section hinged to said fixed section and supported from the frame when unfolded by suitable braces, compression slats formed of hinged sections, a yielding retaining device for the forward ends of the said slats, an elevating cylinder revolubly mounted beneath the receiving end of the elevator and having gathering fingers adapted to automatically change their radial positions during the rotation of the cylinder, and a series of gathering teeth disposed between the ground and the fingers of the cylinder, substantially as specified.

9. In a hay loader, the combination of an elevator composed of a fixed and a folding section, a carrier operatively mounted in said elevator, a compressing mechanism comprising slats secured to the elevator above the carrier, the same consisting of fixed and folding sections, yielding compression means for the free ends of the folding section, and a knock down support for the folding section of the elevator.

10. In a hay loader, the combination of a frame mounted on ground wheels, an elevator comprising a fixed and a folding section, the former supported from the frame and the latter hinged to the fixed section, a knockdown support for the folding section, an elevating cylinder revolubly supported beneath the receiving end of the fixed section, a carrier actuated by the cylinder, a series of sweep-rake gathering teeth beneath the cylinder, a transverse rod below the level of the cylinder supporting the teeth, means for rocking the rod to change the angle of the teeth, and a series of guards suspended from the receiving end of the elevator and projecting down between the rear ends of the teeth.

11. In a hay loader, the combination of a frame mounted on ground wheels, an elevator comprising a fixed and a folding section, the former supported from the frame and the latter hinged to the fixed section, a knockdown support for the folding section, an elevating cylinder revolubly supported beneath the receiving end of the fixed section, a carrier actuated by the cylinder, a series of sweep-rake gathering teeth beneath the cylinder, a support for said teeth, means for oscillating the support to change the angle of the teeth, hinged compression slats supported above the carrier, and means for yieldingly holding each tooth to adapt it to have independent movement.

12. In a hay loader, the combination of an elevator composed of folding sections, compression slats supported above the elevator, also composed of hinged sections, a carrier, an elevating cylinder for delivering material to the carrier, also to operate the same, gathering teeth adapted to gather and deliver material to the cylinder, and adjustably carried boards, carried by the forward section of the elevator, adapted to vary the path of material as the same is carried through the elevator.

13. In a hay loader, a frame, an elevator composed of a fixed and a folding section, a series of gathering teeth, a lever and a locking device coöperating therewith for raising or depressing the teeth, an elevating cylinder interposed between the teeth and elevator, and bars for supporting the folding section of the elevator when opened, the said bars pivoted at their lower ends, and sockets attached to the folding elevator section with which the upper ends of said bars are detachably connected.

In testimony whereof I affix my signature, in presence of two witnesses.

WILLIAM R. McGOWEN.

Witnesses:
J. S. FIELD,
ROBERT N. McCORMICK.